(12) United States Patent
Shekar CS et al.

(10) Patent No.: US 8,122,111 B2
(45) Date of Patent: Feb. 21, 2012

(54) SYSTEM AND METHOD FOR SERVER CONFIGURATION CONTROL AND MANAGEMENT

(75) Inventors: Raja Shekar CS, Bangalore (IN);
Armeet Deulgaonkar, Bangalore (IN);
Ravindra Kumer, Bangalore (IN);
Anurag Palsule, Bangalore (IN)

(73) Assignee: Network Appliance, Inc., Sunnyvale, CA (US)

( * ) Notice: Subject to any disclaimer, the term of this patent is extended or adjusted under 35 U.S.C. 154(b) by 962 days.

(21) Appl. No.: 11/493,167

(22) Filed: Jul. 25, 2006

(65) Prior Publication Data

US 2008/0028048 A1 Jan. 31, 2008

(51) Int. Cl.
*G06F 15/177* (2006.01)
*G06F 15/173* (2006.01)

(52) U.S. Cl. ......... 709/221; 709/220; 709/223; 709/224

(58) Field of Classification Search .................. None
See application file for complete search history.

(56) References Cited

U.S. PATENT DOCUMENTS

| | | | | |
|---|---|---|---|---|
| 6,098,098 A * | 8/2000 | Sandahl et al. | ................ | 709/221 |
| 6,151,674 A * | 11/2000 | Takatani | ............................. | 713/2 |
| 6,513,115 B2 * | 1/2003 | Nock et al. | ..................... | 713/100 |
| 6,543,004 B1 | 4/2003 | Cagle et al. | | |
| 6,601,066 B1 * | 7/2003 | Davis-Hall | ......................... | 707/5 |
| 6,792,461 B1 * | 9/2004 | Hericourt | ...................... | 709/225 |
| 7,415,509 B1 * | 8/2008 | Kaltenmark et al. | ......... | 709/219 |
| 7,516,218 B2 * | 4/2009 | Besson | .......................... | 709/225 |
| 7,783,800 B2 * | 8/2010 | Staats et al. | ...................... | 710/64 |
| 7,912,916 B2 * | 3/2011 | Rakowski et al. | ............. | 709/217 |
| 2003/0069946 A1 * | 4/2003 | Nair et al. | ...................... | 709/220 |
| 2003/0105881 A1 * | 6/2003 | Symons et al. | ................ | 709/249 |
| 2004/0003266 A1 * | 1/2004 | Moshir et al. | .................. | 713/191 |
| 2004/0044763 A1 * | 3/2004 | Besson | .......................... | 709/224 |
| 2004/0117358 A1 * | 6/2004 | von Kaenel et al. | .............. | 707/3 |
| 2005/0256871 A1 * | 11/2005 | Semerdzhiev | ..................... | 707/9 |
| 2006/0104220 A1 * | 5/2006 | Yamazaki et al. | ............. | 370/254 |
| 2006/0112135 A1 * | 5/2006 | Warshawsky | .................. | 707/102 |
| 2006/0179116 A1 * | 8/2006 | Speeter et al. | ................ | 709/217 |
| 2006/0195575 A1 * | 8/2006 | Delany et al. | ................... | 709/225 |
| 2006/0282479 A1 * | 12/2006 | Johnson et al. | ................ | 707/203 |
| 2007/0168721 A1 * | 7/2007 | Luiro et al. | ...................... | 714/15 |
| 2007/0198609 A1 * | 8/2007 | Black et al. | .................... | 707/204 |
| 2008/0028048 A1 * | 1/2008 | Shekar CS et al. | ............ | 709/220 |
| 2008/0052391 A1 * | 2/2008 | Rogers et al. | ................. | 709/224 |

FOREIGN PATENT DOCUMENTS

| | | |
|---|---|---|
| EP | 0 952 521 A2 | 10/1999 |
| EP | 0 957 617 A2 | 11/1999 |
| WO | WO 01/71979 A2 | 9/2001 |
| WO | WO 2005/088473 A1 | 9/2005 |

* cited by examiner

*Primary Examiner* — David England
(74) *Attorney, Agent, or Firm* — Blakely, Sokoloff, Taylor & Zafman LLP

(57) ABSTRACT

Methods of obtaining and comparing data processing system configurations, and producing reports of differences between the configurations, where the configurations include elements to control access from a remote client to a storage facility of a data processing system, are described. Systems to receive and alter a configuration based on local conditions, and to use the altered configuration to control data exchange logic are also described. Software to display configuration elements, identify differences between configurations, and attach attributes to configuration elements is also described.

20 Claims, 9 Drawing Sheets

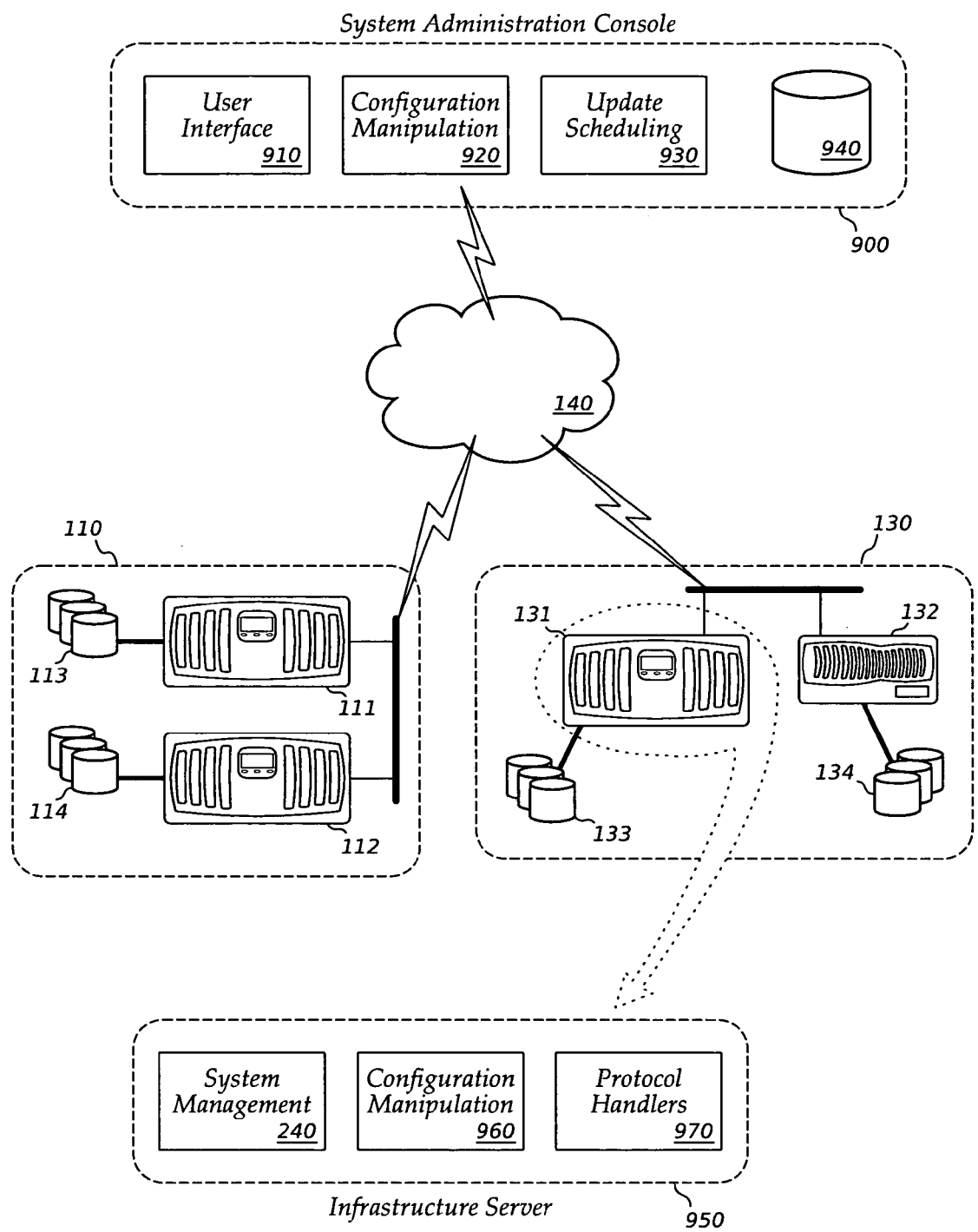

SYSTEM AND METHOD FOR SERVER CONFIGURATION CONTROL AND MANAGEMENT

FIELD

The invention relates to managing data processing system configurations. More specifically, the invention relates to managing system configurations in a network storage system.

BACKGROUND

Large-scale data processing systems frequently rely on banks of similar or identical machines to provide infrastructure services, rather than requiring each computer in the system to operate autonomously by including all of its own infrastructure. For example, data storage functionality is often consolidated into a server or data server array; this can facilitate efficient backup strategies and permit an arbitrary number of data processing systems to access and operate on a common data set. (An alternative to this arrangement might involve providing some of the overall data storage space required at each processing system, but this approach may complicate application design by requiring software to distinguish between data stored locally and data stored on other peer systems. Successful backup strategies may be more difficult to implement, and the failure of an individual system may impact the work of other systems that needed access to the data stored on the failed system.)

Of course, shifting an infrastructure function such as data storage onto a bank of special-purpose machines gives rise to a different set of challenges, even as it alleviates some difficulties of managing a large-scale system. Important among these challenges is the task of configuring the bank of machines so that each operates as intended to provide the infrastructure function. Even special-purpose machines that only provide a limited range of services may have complex configuration requirements, particularly when the machines are installed at diverse geographical locations to provide redundancy and/or to take advantage of services or facilities with locality-dependent aspects.

Groups of servers that are to work together to provide a basic data processing service with redundancy and high availability may require consistent and coordinated, but not identical, configurations. As a simple example, consider two data storage servers (e.g., "fileservers") that are to store data for client systems. These servers may need identical configurations to control access from remote clients, but they may need different network communication configurations because they are connected to a distributed data network through two different circuits.

Current system management procedures generally take an ad hoc approach to managing similar systems. For example, an administrator may keep copies of various generic configurations in a library, and prepare a configuration for a new system based on the closest generic configuration. However, once a generic configuration is customized and deployed, there is often no way to update a common parameter in all the configurations of servers in the farm without connecting to each machine in turn and making the modification—a time-consuming and error-prone task.

Therefore, a better method of configuring and managing many similar (but not necessarily identical) data processing systems efficiently may be of value in this field.

SUMMARY

Some embodiments of the invention obtain data processing system configurations, each configuration to include an element to control access from a remote client to a storage facility of a data processing system, and compare the configurations. Configuration differences detected during the comparison may be reported to a system administrator or management center for further investigation and possible correction. Other embodiments obtain a base configuration for a data processing system and override some elements of the base configuration to produce a locally-adapted configuration that may be used to control interactions between the data processing system and a data storage client. Still other embodiments permit attributes to be attached to elements of a data processing system configuration, the attributes to control the subsequent use of the configuration.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 9 shows an overall combination logical and physical diagram of a distributed system.

DETAILED DESCRIPTION

As described in greater detail below, the solution introduced here provides methods and apparatus to improve the accuracy and efficiency of configuring a large number of similar systems. For simplicity, these techniques are often described in scenarios limited to a small number of systems, but it will be clear to those of skill in the art that extending the ideas to an arbitrarily large number of systems is straightforward and proportionately beneficial.

Figure 1:
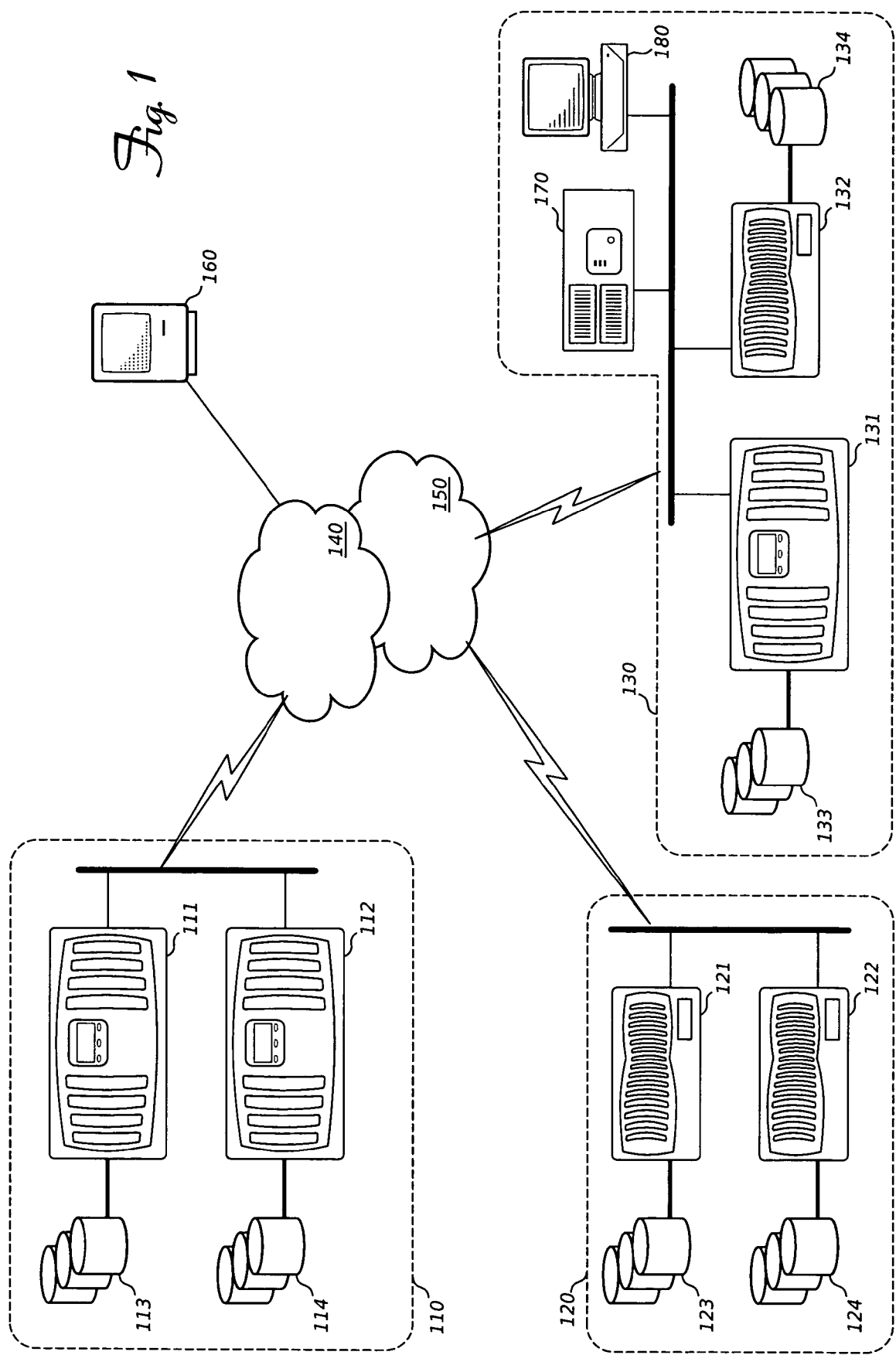
FIG. 1 shows an environment where an embodiment of the invention operates.

FIG. 1 shows an environment where embodiments of the invention may usefully be deployed. A number of data centers 110, 120, 130 are shown; each data center contains several data processing systems 111, 112; 121, 122; 131, 132 connected to arrays of mass storage devices 113, 114; 123, 124; 133, 134 and configured to provide data storage services. Control instructions and data may be transferred between data centers across a public distributed data network 140 such as the Internet, or across one or more private distributed data networks 150, or some combination of these types of networks. Data storage services may be provided directly to a client 160, or may be used by a server 170 that provides a derivative service to client 160. The distributed data processing system may be managed from a network operations center ("NOC") or administrative console, shown here as computer system 180.

Figure 2:
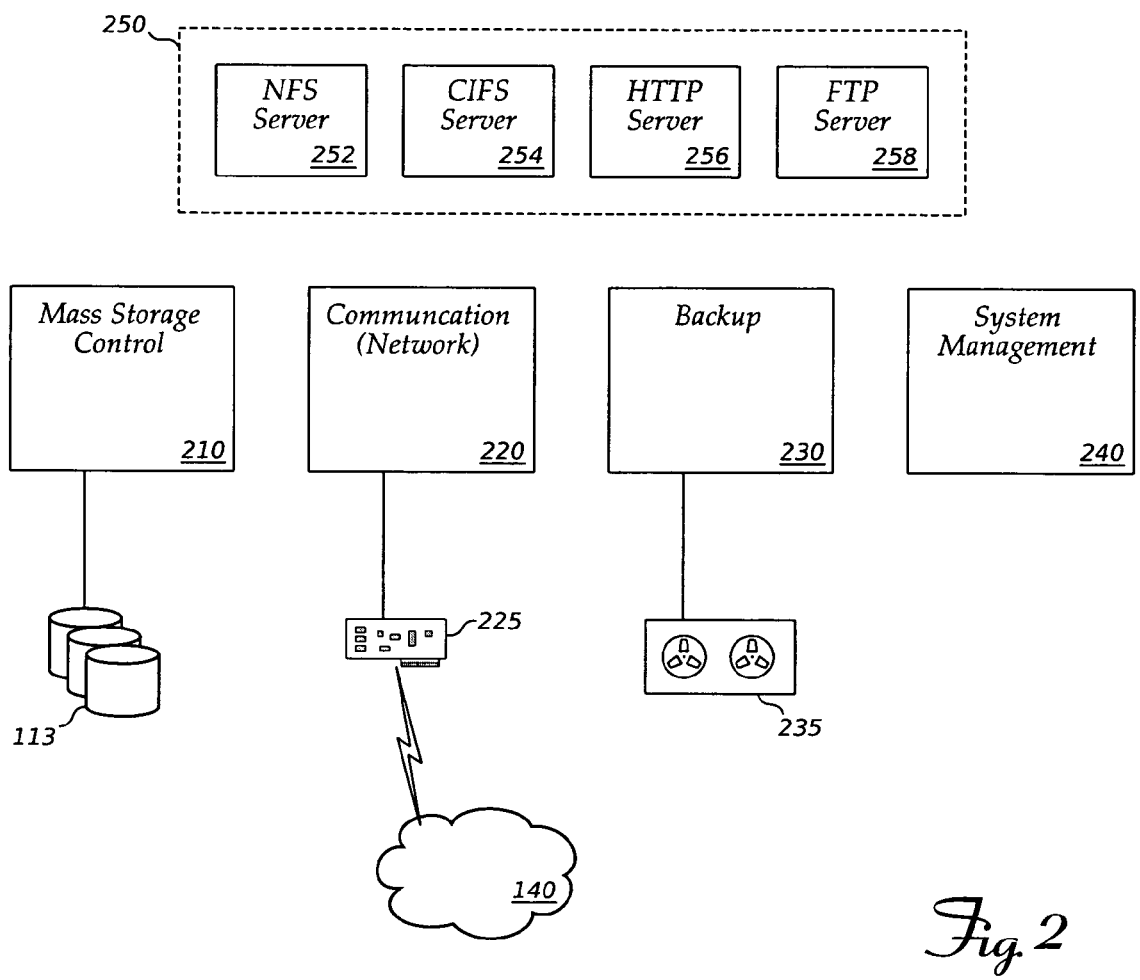
FIG. 2 shows some subsystems of an infrastructure server including an embodiment of the invention.

FIG. 2 shows some subsystems that may be present in an infrastructure server such as the data storage servers shown in FIG. 1, whose configuration can be managed by an embodiment of the invention. The server may include mass storage control logic 210 to control an array of storage devices 113; communication logic 210 to drive a network interface 225 that allows the system to communicate over a distributed data network 140; backup logic 230 to operate a backup device 235, and system management logic 240 to coordinate configuration and operation of the various subsystems. In the server depicted in this figure, the infrastructure services are provided to clients by several servers 250, which respond to requests according to various protocols. Specifically shown are Network File System ("NFS") server 252, Common Internet File System ("CIFS") server 254, Hypertext Transfer Protocol ("HTTP" or "web") server 256, and File Transfer Protocol ("FTP") server 258. The servers 252, 254, etc. can be software modules or layers implemented within the same physical computing platform.

Figure 3:
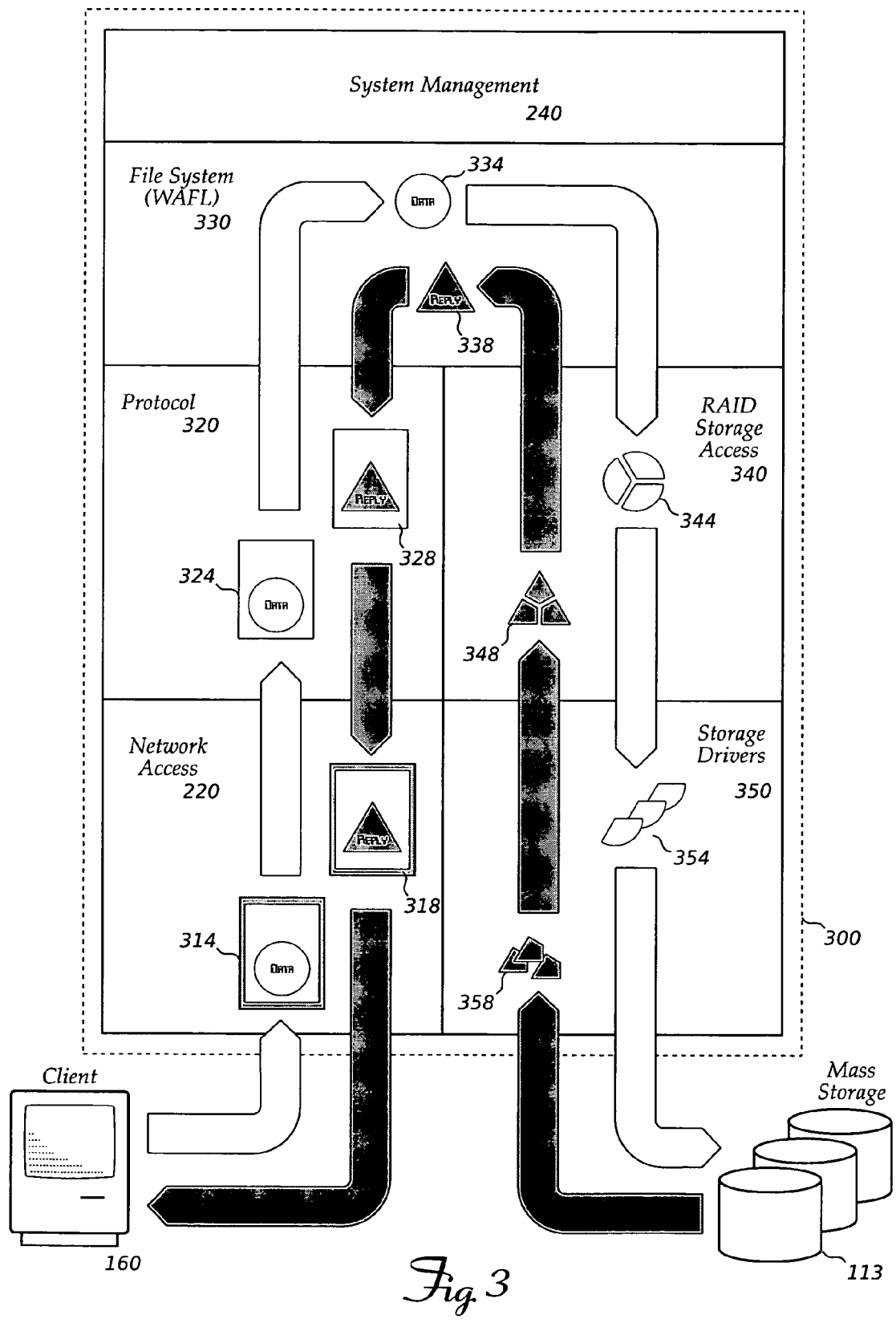
FIG. 3 shows a logical flow of operations in a file server.

FIG. 3 illustrates an example of the logical structure of the operating system of a storage server, such as any of servers 111, 112, 121, 122, 131, 132 in FIG. 1, and also indicates the logical sequence that the subsystems of FIG. 2 may perform to respond to a data storage or retrieval request from a client 160. The request 314 may arrive at the server 300 via a network data connection and be processed by a network access layer 220. The request includes a payload containing instructions and data from the client to the server and a network header. The header may specify, among other things, source and destination addresses and the particular protocol to which the request conforms (e.g., NFS). The payload 324 is passed up through a protocol-handling layer 320, which implements one or more of the different types of servers/protocols represented in FIG. 2, and eventually to a file system layer 330, which processes data 334 to determine what action the client is requesting, and how the filesystem can accommodate the request. If there is data to be stored, the file system layer 330 may pass it to a RAID (Redundant Arrays of Independent Disks) storage access manager 340, where it may be separated into portions 344 according to a data protection and error recovery scheme, then passed to storage drivers 350 and written on an array of mass storage devices 113.

If the client's request is to retrieve information, the data flow proceeds in the reverse direction: data fragments 358 may be retrieved from the array of mass storage devices 113 and put together 348 to prepare a client reply 338. The reply may be encapsulated within a protocol-compliant packet 328, then placed in an "envelope" 318 for transmission over the distributed data network to client 160.

The subsystems shown in FIG. 2 generally require configuration to be able to perform their portions of the logical flow described with reference to FIG. 3. For example, a network communication subsystem may require information about the addresses it is to respond to and the network routers it is to use; and an NFS or CIFS server may need information to control access from remote clients to data storage resources. Various subsystems may obtain their configuration information through different channels. For example, some subsystems may read a text file when starting, while others may refer to arguments passed on a command line, retrieve information from a database or registry, or query a central repository of configuration data through a network connection. Text configuration files may have a predetermined structure required by the subsystem to which they apply. Text files may contain lines of "keys" and "values;" free-form configuration directives; hierarchical settings in a representation such as eXtensible Markup Language ("XML"); Hypertext Markup Language ("HTML") data, or the like.

Figure 4:
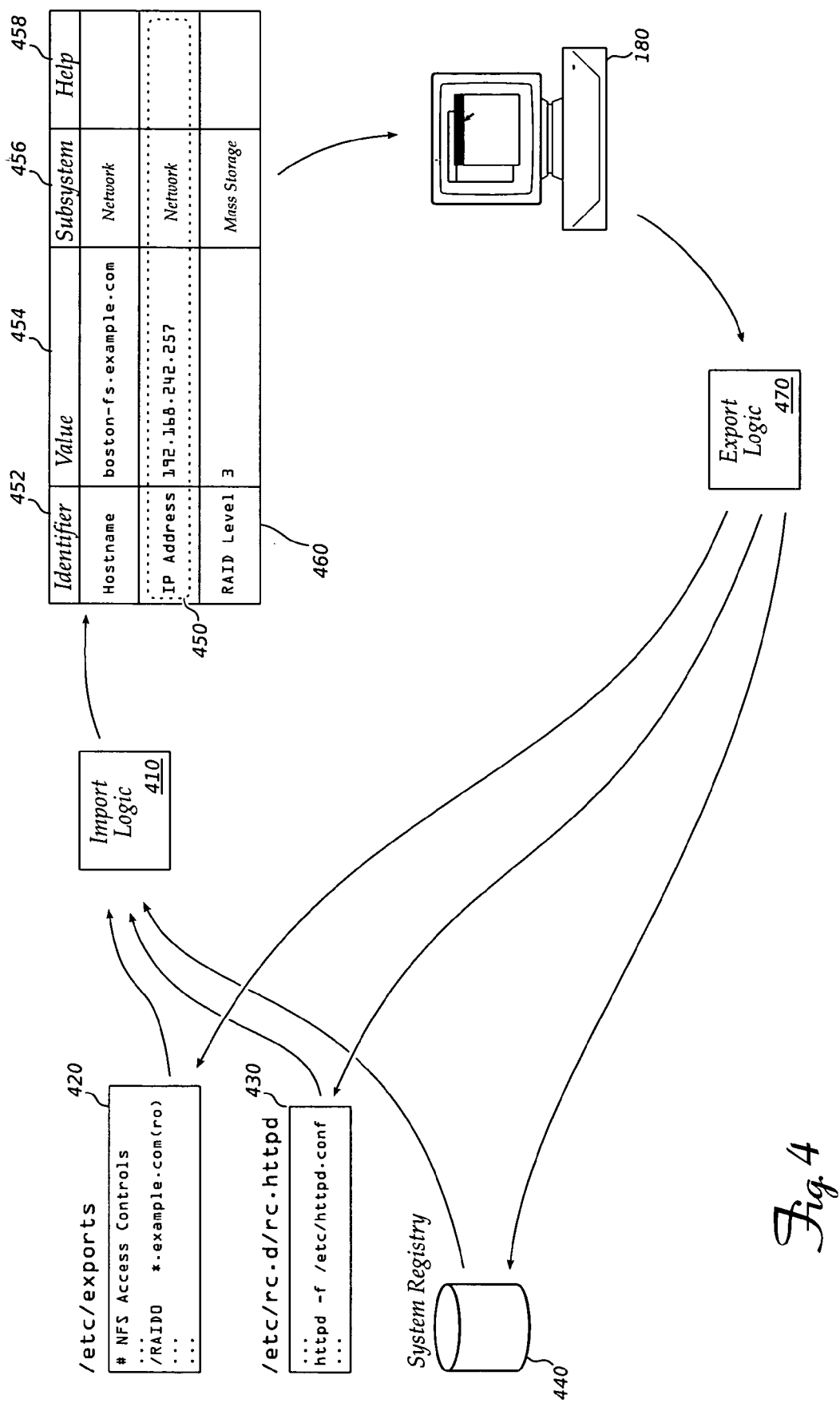
FIG. 4 illustrates configuration element import and export.

A basic configuration management tool might include the elements shown in FIG. 4: import logic 410 may collect configuration information for various subsystems from the location where the subsystem expects to find it: for example, a configuration file in a predetermined directory 420, a command line given in a system startup script 430, or a database 440. The configuration information may be separated into "elements" 450, where an element may include an identifying name 452, a value 454, and other useful information such as the subsystem or subsystems affected by the configuration element 456 or a textual help message 458 to explain how the element is used. The set of configuration elements imported from various sources may be manipulated as a single consolidated configuration 460.

The configuration management tool, which may run on a management workstation 180, presents a consolidated view of configuration elements for many different subsystems and interact with a system administrator to select appropriate configuration values. When the administrator is satisfied with the configuration, export logic 470 writes the configuration elements back to the appropriate locations (i.e. the same configuration files, startup scripts, and registry entries that the elements came from in the first place) and in the appropriate formats. For example, a text-based configuration file may have lines of "keys" and "values," or may be formatted as a hierarchical extensible Markup Language ("XML") file. The configuration management tool may provide a button or control to reset the newly-reconfigured system or otherwise make the new configuration effective.

Some embodiments may use XML as a common or intermediate format (i.e. the import logic may produce an XML document containing configuration elements drawn from various sources, and the export logic may convert an XML document back into native formats such as text files or database records). XML is a widely-adopted text-based format that permits hierarchical data to be represented effectively for convenient machine analysis and processing.

The tool described with reference to FIG. 4 can begin to address the problem of configuring a server that is to provide infrastructure data processing services to clients by providing a consolidated view of configuration elements that affect various storage server subsystems. However, embodiments of the solution introduced here go beyond this basic capability to assist in the management of groups or "farms" of infrastructure servers. As mentioned earlier, groups of servers that are to work together to provide a basic data processing service with redundancy and high availability may require consistent and coordinated, but not identical, configurations. (Of course, identical configurations can also be managed by the same methods.) A configuration management tool that provides some of the following functional capabilities may be useful in this environment.

Figure 5:
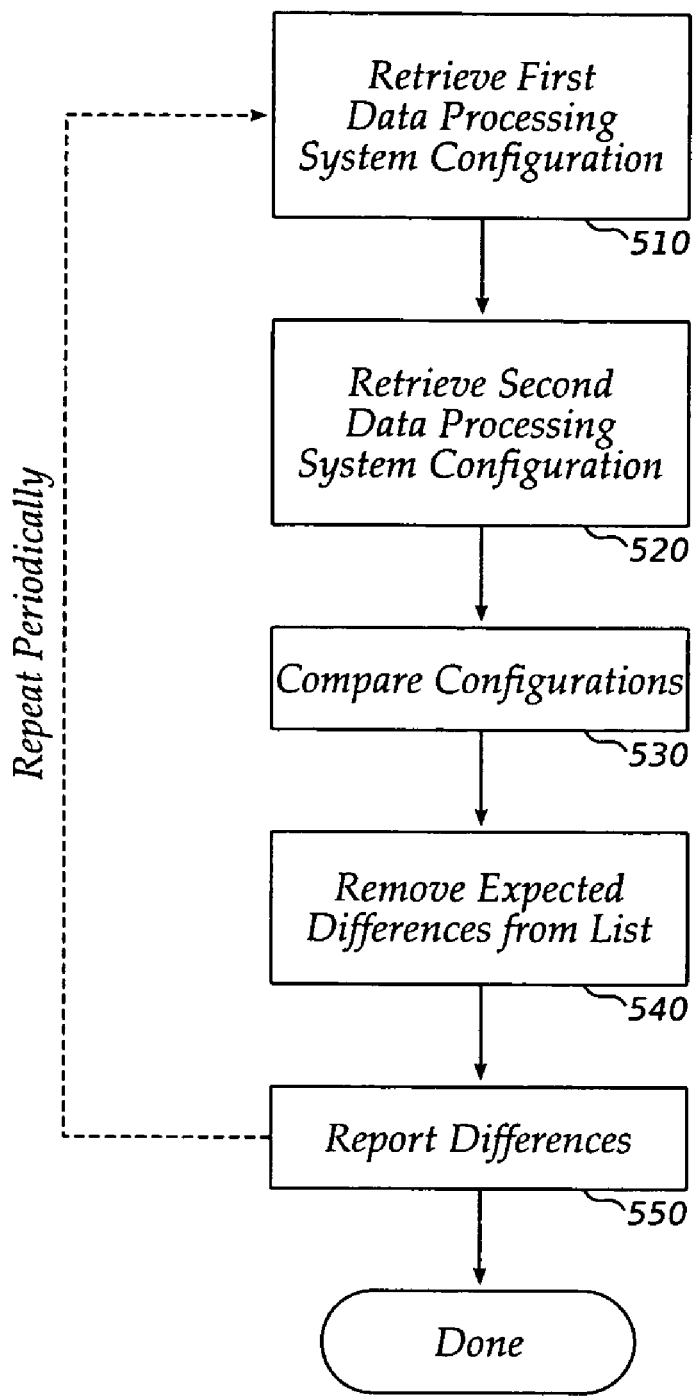
FIG. 5 outlines the operations of an embodiment of the invention.

FIG. 5 is a flow chart outlining a first functional capability of an embodiment of the invention: identifying differences between system configurations. A first data processing system configuration is retrieved (510), perhaps by querying a remote system ("pulling" the configuration from the remote system). Retrieving the configuration may involve importing the configuration elements from a number of different sources, as described earlier. The importing may be performed on the remote system, so that the management station receives commonly-formatted elements; or on the management system, after raw configuration data (files, command lines, and database tables) are transmitted from the remote system.

A second data processing system configuration is also retrieved (520). The second configuration may come from a second remote system or from a data repository containing a previously-stored copy of the first system's configuration.

Next, the two configurations are compared, element by element (530) to detect differences between the configurations. Some differences between the configurations may be expected (for example, when two similar but not identical servers' configurations are compared, their hostnames and Internet Protocol ("IP") addresses will probably differ). An embodiment may maintain a list of identifiers of configuration elements that are expected to be different, and remove expected differences from the list of all differences found (540), leaving only unexpected differences. Finally, the differences detected (except for those that may have been filtered out in 540) are reported to a user (550). Reports may list all differences or only unexpected differences in a plain text format, in XML or HTML, or in a database-friendly format such as comma-separated values ("CSV") or records for the Excel™ database by Microsoft Corporation of Redmond, Wash. ("XLS records").

An embodiment of the invention may repeat this procedure on a configurable schedule to produce a periodic report of changes between a system's actual configuration and its expected configuration. Differences may be reported by printing them as a list, sending them as electronic mail, or generating a notification event at a network management station. Periodic configuration monitoring may help guard against inadvertent or malicious tampering with the configurations of a plurality of servers that may be detected as unexpected configuration element differences. For example, an unexpected change in the identities of users who are authorized to administer the server, or an unexpected disk partition allocation, may indicate a security breach.

Figure 6:
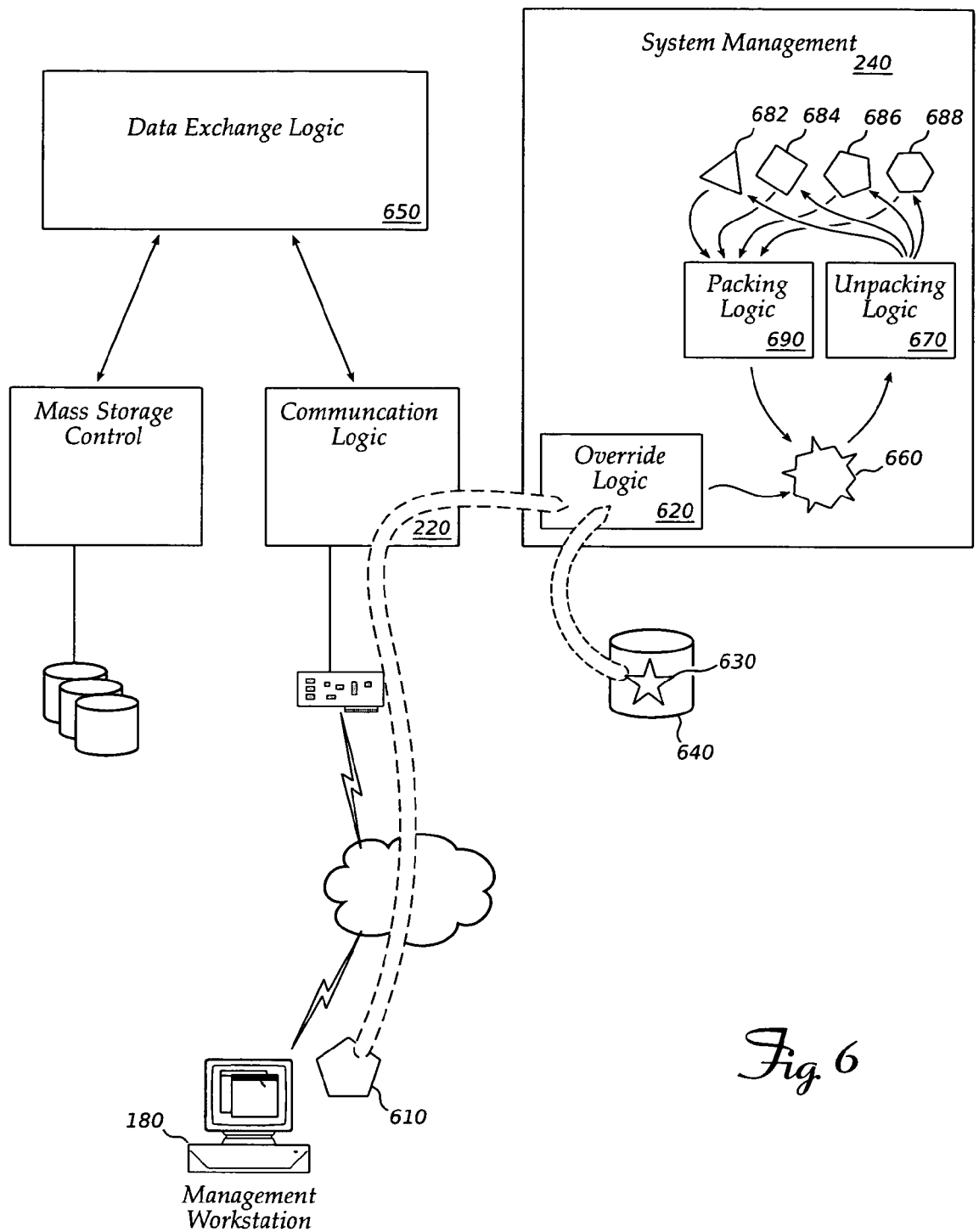
FIG. 6 is a block diagram of file server subsystems according to another embodiment of the invention.

Another embodiment of the invention can assist in deploying similar (but not necessarily identical) configurations to a number of data processing systems. As shown in FIG. 6, a server may include (among other subsystems such as those shown in FIG. 2) communication logic 220 to receive a base (or "generic") configuration 610 from a management workstation 180, override logic 620 to alter a configuration element of the base configuration 610 according to a local condition 630 and produce a localized configuration 660, and data exchange logic 650 to interact with a data storage client according to the altered configuration 660. In such a system, unpacking logic 670 may be used to extract configuration elements from the localized version 660 of the consolidated configuration 610 received from the management station 180 and prepare a text file 682, a database entry 684, an XML file 686, and/or a registry entry 688, as appropriate, to configure the various subsystems of the server. Packing logic 690 may be used to perform the reverse operation, preparing a consolidated configuration from various text files, database entries, XML files and/or registry entries. Information about configuration elements to override and the appropriate values to use may be stored in a local database 640.

The "override" logic described above with reference to FIG. 6 can also be implemented at the management workstation. Consider the following example: an administrator wishes to manage ten storage servers in a remote data center. The servers are to be configured similarly and cooperate closely, so the administrator establishes a group containing the servers and creates a generic configuration for them. The generic configuration may be transmitted ("pushed") to (or received—pulled—by) the servers periodically, as described above.

Now, the administrator is asked to enable a new feature on one of the servers so that it can be evaluated before being enabled for all ten servers. A configuration change to enable the feature can be entered and stored at the management workstation, and the change can be marked to override the generic configuration (which leaves the new feature disabled) for only one of the ten servers. Subsequently, only that server will receive the non-standard configuration, and only that server will activate the feature. Later, if the evaluation period is successful, the change can be set to override the generic configuration for all ten servers, or the generic configuration itself can be modified to enable the feature.

Note that the preceding example involves various actions by a system administrator only to explain a possible usage scenario and the motivations behind it. Embodiments of the invention can operate without human interaction.

Configuration elements in a generic configuration may contain a flag or permission indicator to control whether they are allowed to be changed or overridden by override logic on a server system. In some embodiments, several layers of permissions may be implemented, so that a generic configuration may be distributed to a regional data center containing a plurality of server systems (e.g., storage servers), and a first group of generic configuration elements may be overridden to adapt the configuration to the common needs of the servers at the regional data center. Then, the region-appropriate configuration may be forwarded to individual servers, which may apply server-specific overrides to a different (though possibly overlapping) set of configuration elements.

In a manner similar to the periodic configuration retrieval and check described with reference to FIG. 5, systems like those shown in FIG. 6 may periodically retrieve (or a management station may periodically send) a generic configuration which will be adapted according to local overrides and applied to the system. The periodic reconfiguration may be used to ensure that inadvertent or malicious changes do not remain in effect for an extended period of time. For example, the system could be reconfigured every hour, every day, or every week, as appropriate to the threat environment. In some embodiments, a configuration change alerter may detect configuration changes and transmit the current operating configuration to a central management station whenever a change occurs. System administrators at the central management station may review the change and decide whether to permit it (and possibly to ignore the difference between the system's configuration and a template configuration in subsequent comparison cycles) or to reject it, push an earlier configuration, and restrict local changes to certain configuration elements.

Figure 7:
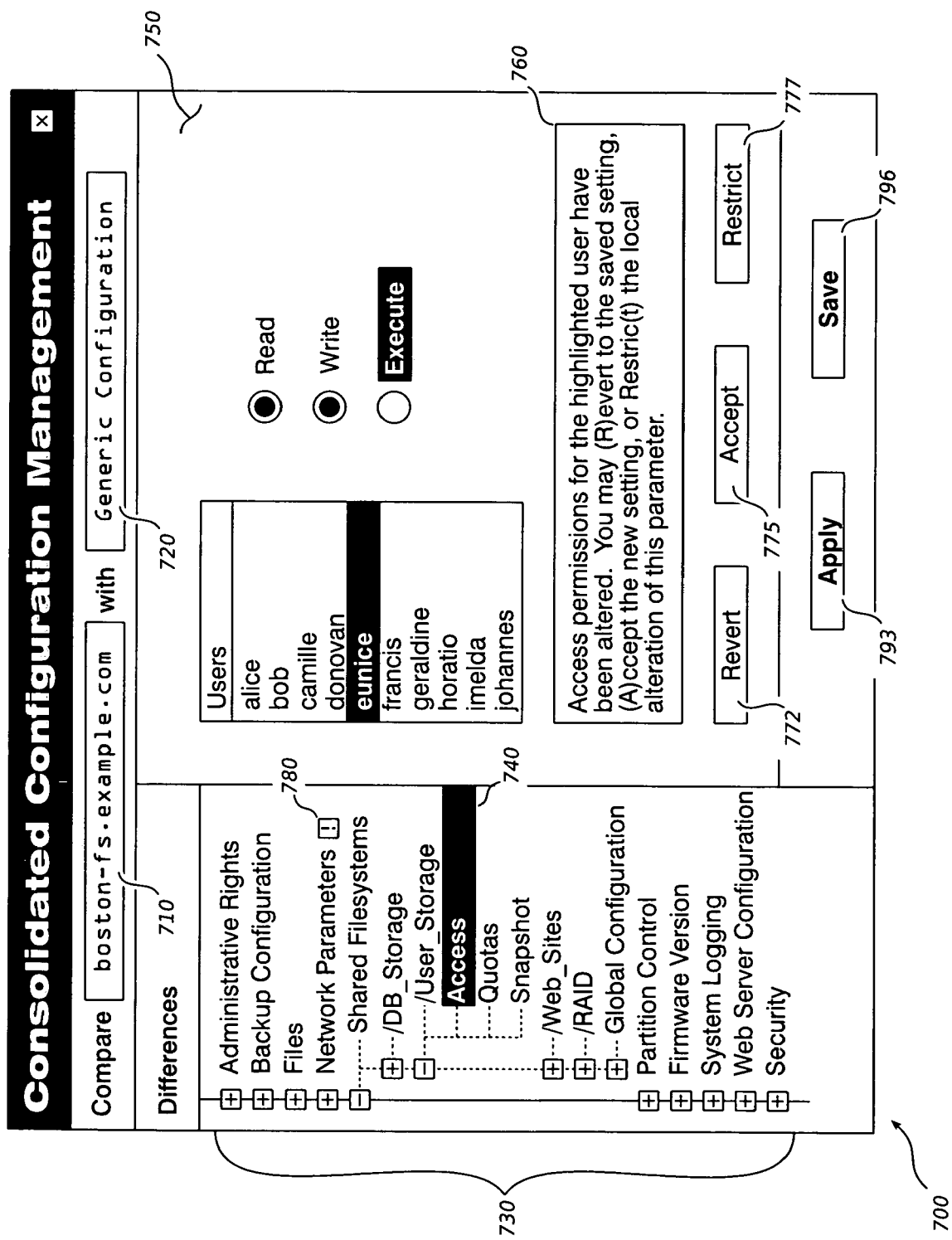
FIG. 7 shows an example user interface of another embodiment of the invention.

FIG. 7 shows a sample user interface screen 700 of a software program to assist system managers in administering a plurality of similar servers. This user interface can be implemented by a tool such as described with reference to FIGS. 5-6. The interface has a field 710 which identifies the name of a file server, the configuration of which has been compared with a generic configuration identified in field 720. A portion 730 of the configuration elements (fields) are shown in a hierarchical "tree" view, and a particular configuration element 740 is highlighted to indicate that a difference has been detected between the two configurations. "Detail" window 750 shows more information about the difference; in this example, the system configuration has been altered from the generic configuration to remove "execute" access from a remote user to a storage facility of the data processing system. This alteration is described in further detail in "Help" sub-window 760. The user interface permits a manager (e.g., a storage network administrator) to identify and examine such differences, and to take several different actions when a difference is encountered. First, the manager may activate control 772 to reject the change and revert to the generic configuration. Second, the manager may activate control 775 to accept the change and ignore the difference in future configuration comparisons. Finally, the manager may forbid local changes at the remote file server by activating control 777.

Figure 8:
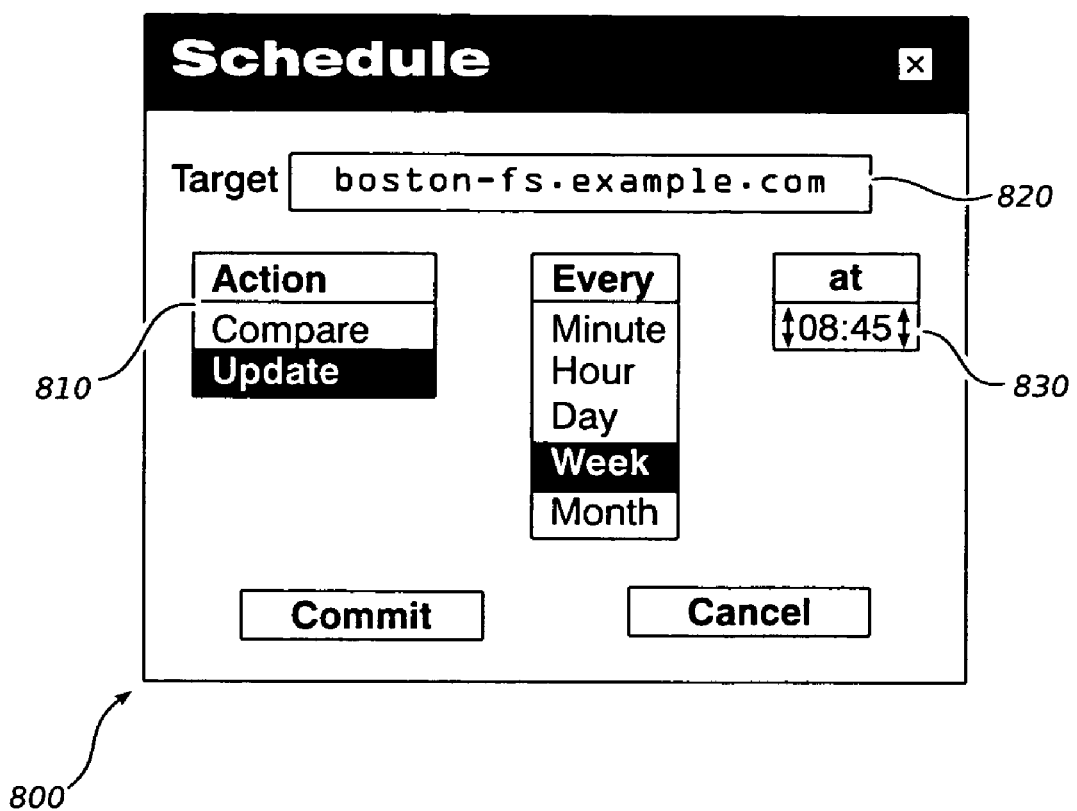
FIG. 8 shows a second example user interface of the third embodiment of the invention.

Once the manager is satisfied with the configuration displayed by the software program, he may activate control 793 to cause the configuration to be pushed to one or more remote systems, or control 796 to cause the configuration to be saved for later reference. A scheduling control or menu selection (not shown) may lead to an interface screen such as that shown in FIG. 8, element 800, where the manager can arrange for periodic configuration action 810 (e.g. compare or update) of a target server 820 at a particular period and time 830, as described with reference to other embodiments.

FIG. 9 is a combination logical/physical system diagram, showing where parts of embodiments may be deployed in a complete system. A system administration console 900, which can be implemented in software and installed on a computer in a network operations center ("NOC"), includes a user interface 910, configuration manipulation logic 920, and update scheduling logic 930. Reference configuration data may be stored in a local database 940. The administration console 900 communicates with infrastructure servers in data centers 110 and 130 over a distributed data network 140. Within each data center, similar servers 111 and 112 or dissimilar servers 131 and 132 are configured to provide data storage services to clients (not shown). User data is stored on mass storage devices 113, 114, 133 and 134, which may be configured as Redundant Arrays of Independent Disks. Each infrastructure server includes logical subsystems as shown at element 950: system management logic 240, configuration manipulation logic 960 (which complements the system administration console's configuration manipulation logic 920), and protocol handlers 970 to interact with clients and fulfill client requests.

An embodiment of the invention may be a machine-readable medium having stored thereon instructions which cause a programmable processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM) and Erasable Programmable Read-Only Memory (EPROM).

The term "logic," as used herein, can include, for example, hardwired circuitry, programmable circuitry (e.g. Field-Programmable Gate Arrays ("FPGAs")), software instructions executed by a programmable processor, or any combination thereof.

The applications of the present invention have been described largely by reference to specific examples and in terms of particular allocations of functionality to certain hardware and/or software components. However, those of skill in the art will recognize that flexible fileserver configuration management can also be achieved by software and hardware that distribute the functions of embodiments of this invention differently than herein described. Such variations and implementations are understood to be captured according to the following claims.

We claim:

1. A method comprising:
   detecting a change in a first configuration, wherein the first configuration configures a remote server;
   obtaining, by a managing server in response to the detecting, the first and a second configurations, each said configuration including a set of configuration elements wherein at least one configuration element is to control access from a remote client to a storage facility of a server;
   comparing elements of the first configuration to corresponding elements of the second configuration to identify the change; and
   reporting the change between the first configuration and the second configuration based on a result of said comparing;
   receiving, by the managing server, an input indicating to reject the change;
   overwriting, by the managing server in response to the input, the first configuration on the remote server with the second configuration; and
   providing, by the managing server, a set of local change restrictions to the remote server, wherein the set of local change restrictions defines elements of the second configuration that require permission from the managing server to change and wherein the remote server uses the set of local change restrictions to determine whether to make a change to the second configuration without permission from the managing server.

2. The method of claim 1 wherein
   obtaining the first configuration comprises retrieving an operational configuration from a remote server; and
   obtaining the second configuration comprises reading a stored configuration.

3. The method of claim 2, further comprising:
   repeating the obtaining, comparing and reporting operations according to a configurable schedule.

4. The method of claim 1 wherein reporting comprises generating an event at a network management station.

5. The method of claim 1, further comprising:
   recording an identifier of a configuration element; and
   omitting configuration elements matching the identifier from at least one of the comparing and reporting operations.

6. The method of claim 1 wherein the first configuration comprises configuration elements drawn from at least two of a configuration file, a database table, an extensible markup language ("XML") file, or a registry setting.

7. A system comprising:
   a processor;
   communication logic to cause the processor to receive a base configuration including a plurality of configuration elements from a management station;
   override logic to cause the processor to alter a local configuration element of the base configuration according to a local condition if alterations are permitted;
   data exchange logic to cause the processor to interact with a data storage client according to the altered configuration;
   management response logic to cause the processor to overwrite the base configuration with a mandatory configuration received from the management base station and to cause the processor to disable the override logic in response to a command received from the management station, wherein the command is received in response to an alteration of a local configuration element; and change restriction logic to receive and enforce a set of local change restrictions, wherein the set of local change restrictions defines elements of the mandatory configuration that require permission from the management base station to change and change restriction logic uses the set of local change restrictions to determine whether to make a change to the second configuration without permission from the management base station.

8. The system of claim 7, further comprising:
unpacking logic to prepare at least one of a text file, a database entry, an extensible markup language ("XML") file, or a registry entry based on the altered configuration.

9. The system of claim 7, further comprising:
packing logic to prepare a consolidated configuration based on at least two of a text file, a database entry, an extensible markup language ("XML") file, or a registry entry; and
management interface logic to transmit the consolidated configuration to a management station.

10. The system of claim 7, further comprising:
configuration logic to set the local condition, wherein one of the configuration logic and the override logic is to ignore the local condition if the configuration element is protected in the base configuration.

11. The system of claim 7, further comprising:
initialization logic to load the altered configuration as a current operating configuration; and
management interface logic to transmit the current operating configuration to the management station.

12. The system of claim 11 wherein the management interface logic is to transmit the current operating configuration periodically at a configurable interval.

13. The system of claim 11 wherein the management interface logic is to transmit the current operating configuration if a local condition changes.

14. The system of claim 7 wherein the configuration comprises a plurality of configuration elements, and wherein configuration elements are drawn from at least two of a configuration file, a database table, an extensible markup language ("XML") file, or a registry setting.

15. A non-transitory machine-readable storage medium storing instructions to cause a programmable processor to perform operations comprising:
displaying, on a management station, a plurality of configuration elements of a first configuration of a remote computer, wherein at least one of the plurality of configuration elements is to control access from a remote client to a storage facility;
indicating a difference between the first configuration and a second configuration;
attaching an attribute to one of the plurality of configuration elements;
storing the plurality of configuration elements with the attached attribute;
receiving an input to reject the difference;
overwriting the configuration of the remote computer with the second configuration;
providing a set of local change restrictions to the remote computer, wherein the set of local change restrictions defines elements of the second configuration that require permission from the management station to change and wherein the remote computer uses the set of local change restrictions to determine whether to make a change to the second configuration without permission from the management station.

16. The non-transitory machine-readable storage medium of claim 15 wherein the attribute is to indicate whether the configuration element may be overridden.

17. The non-transitory machine-readable storage medium of claim 15, containing additional instructions to cause the programmable processor to perform operations comprising:
retrieving the first configuration from the remote computer.

18. The non-transitory machine-readable storage medium of claim 15 wherein storing comprises transmitting the plurality of elements to a remote computer.

19. The non-transitory machine-readable storage medium of claim 18, containing additional instructions to cause the programmable processor to perform operations comprising:
repeating the transmitting operation periodically at a configurable interval.

20. The non-transitory machine-readable storage medium of claim 15 wherein indicating comprises preparing a report identifying the difference, the report to be in one of a text format, an extensible markup language ("XML") format, a hypertext markup language ("HTML") format, a Microsoft Excel ("XLS") format, or a comma-separated value ("CSV") format.

* * * * *

UNITED STATES PATENT AND TRADEMARK OFFICE
CERTIFICATE OF CORRECTION

| | |
|---|---|
| PATENT NO. | : 8,122,111 B2 |
| APPLICATION NO. | : 11/493167 |
| DATED | : February 21, 2012 |
| INVENTOR(S) | : Shekar CS et al. |

It is certified that error appears in the above-identified patent and that said Letters Patent is hereby corrected as shown below:

On the Title Page

Item (75) delete "Armeet Deulgaonkar" and insert -- Ameet Deulgaonkar --.

Signed and Sealed this
Third Day of June, 2014

Michelle K. Lee
*Deputy Director of the United States Patent and Trademark Office*